(12) United States Patent
Schwamborn et al.

(10) Patent No.: US 7,182,900 B2
(45) Date of Patent: Feb. 27, 2007

(54) WINDING TAPE AND METHOD OF MAKING WINDING TAPE

(75) Inventors: Klaus Schwamborn, Wipperfürth (DE); Walter Steffes, Wipperfürth (DE)

(73) Assignee: Hew-Kabel/CDT GmbH & Co. KG, Wipperfurth (DE)

( * ) Notice: Subject to any disclaimer, the term of this patent is extended or adjusted under 35 U.S.C. 154(b) by 345 days.

(21) Appl. No.: 10/345,300

(22) Filed: Jan. 16, 2003

(65) Prior Publication Data

US 2003/0152750 A1   Aug. 14, 2003

(30) Foreign Application Priority Data

Jan. 18, 2002   (DE) ................................ 102 01 833

(51) Int. Cl.
*D01D 5/12* (2006.01)
*D01F 1/00* (2006.01)
*B29C 47/00* (2006.01)
*B32B 9/06* (2006.01)
*B32B 27/00* (2006.01)

(52) U.S. Cl. ............................... 264/210.6; 264/210.2; 264/211.2; 428/411.1; 428/421

(58) Field of Classification Search ............. 428/411.1, 428/420, 910, 421; 138/154, 129, 122; 210/500.36; 264/210.7, 288.8, 290.2, 210.2, 210.6, 211.2
See application file for complete search history.

(56) References Cited

U.S. PATENT DOCUMENTS

| | | | | |
|---|---|---|---|---|
| 3,940,081 A | * | 2/1976 | Kubicki, Sr. | 242/613 |
| 4,791,966 A | | 12/1988 | Eilentropp | |
| 5,772,884 A | * | 6/1998 | Tanaka et al. | 210/500.36 |
| 6,117,556 A | * | 9/2000 | Tamaru et al. | 428/422 |

FOREIGN PATENT DOCUMENTS

CH     562 098     4/1975

* cited by examiner

*Primary Examiner*—B. Hamilton Hess
*Assistant Examiner*—Lawrence Ferguson
(74) *Attorney, Agent, or Firm*—Birch, Stewart, Kolasch & Birch, LLP

(57) ABSTRACT

In a method for manufacturing a winding tape (10) of unsintered polytetrafluoroethylene wherein polytetrafluoroethylene powder is mixed with a lubricating or slip agent, the material is molded into a cylindrical blank (1) and the blank (1) is first extruded as a strand with small outer dimensions and subsequently calendered into the tape (10) in the forming gap (13) of a pair of rolls (8,9). The surface of at least one roll is deformed under compression during calendering of the round rope (6) into the tape.

19 Claims, 1 Drawing Sheet

WINDING TAPE AND METHOD OF MAKING WINDING TAPE

This non-provisional application claims priority under 35 U.S.C. § 119(a) on Patent Application No. 102 01 833.2 filed in Germany on Jan. 18, 2002, which is herein incorporated by reference.

BACKGROUND OF THE INVENTION

1. Field of the Invention

The present invention concerns a method for manufacturing a winding tape of unsintered polytetrafluoroethylene wherein polytetrafluoroethylene powder is mixed with a lubricating or slip agent, the material is molded into a cylindrical blank and the blank is first extruded as a strand with small outer dimensions and subsequently calendered into the tape form.

2. Description of the Background Art

A method of this generic type is known, for example, from Swiss patent 562 098. Here, the extruded strand with small outer dimensions is a flat tape with a rectangular cross-section that is calendered to a thin tape practically without changing its width. The length increases by approximately 5 to 20 times its original length in the process. Apart from the fact that protruding edges on the surface cannot be avoided with such a tape when it is used as winding tape, the extrusion of the powder/lubricant mixture in tape form and subsequent elongation of the tape through calendering results in an orientation of the material particles exclusively in the axial or tape direction. This unidirectional orientation of the material can give rise to longitudinal tears in the end product, for example under temperature cycling stress.

SUMMARY OF THE INVENTION

On the basis of this prior art, the object of the invention is to create a winding tape that would have no protruding edges that would impair the end product and can be used particularly for insulating electrical cables and conductors. In this context, it is important for insulation produced from a winding tape to be equivalent to an insulated covering produced by extrusion of insulating materials with regard to freedom from gaps, compactness, and surface quality. At the same time, the quality of the tape itself is to be improved over the prior art winding tape, for example to eliminate the risk of longitudinal tears in the tape.

This object is attained in accordance with the invention in that the strand extruded from the blank is a round rope that is calendered into a tape by compression in the radial direction such that the quantity of material remaining in the compressed center area made of polytetrafluoroethylene and lubricating or slip agent is greater than the quantity of material remaining in the areas approaching the tape edges. This forming of a round rope into flat tape avoids the disadvantageous orientation of the material particles in just one direction. The non-uniform distribution of material over the cross-section, with massing of material in the center and reduction of material in the edge regions of the tape on both sides, brings about a largely smooth winding, which moreover when multiple windings are arranged one on top of the other and the material is subjected to a sintering process after winding of the tape, produces a compactness and freedom from voids that is directly comparable to an extruded covering.

An improvement in the quality of the tape is achieved in particular when, as specified in a refinement of the invention, the elongation of the calendered tape with respect to the length of the extruded round rope is only a factor of 1 to 3, preferably 1.2 to 2.2. In this way, the longitudinal orientation of the material particles, with its possible adverse consequences for tape quality, is kept to a minimum.

The distribution of material quantities across the tape cross-section that takes place in the production of the tape in accordance with the invention is accomplished advantageously during calendering through one-sided or two-sided flattening of the curvature of the circumferential surface of the round rope in the central area that is first subjected to pressure. Thus, in contrast to the prior art method (Swiss Patent 562 098), when the round rope is calendered into a tape in the axial direction, there is also a redistribution of the material quantity provided by the round rope essentially in the direction of the tape edges. In this process, the forming of the round rope can differ as a function of the intended application. Thus, it can be useful for the round rope to be calendered into an oval cross-section with edge regions that taper to a point, and the winding tape thus obtains exactly this cross-section.

However, it has proven especially advantageous to calender the round rope into a flat profile with wide edge regions that taper from the middle to a point on each side and with uniform tape edges. A tape thus produced is especially suited to the production of coverings—insulation or sheathing—for electrical cables and conductors. Specifically, the uniform, smooth tape edges, in conjunction with the thickened center region, produce an especially smooth, closed outer circumferential surface when the winding is sintered at approximately 350–400° C.

Furthermore, it is important to the winding tape produced by the method in accordance with the invention that the width of the calendered tape corresponds to at least 6 times and preferably 8 to 14 times the diameter of the round rope. This includes an especially high degree of deformation perpendicular to the calendering direction, which has beneficial effects on the tape quality.

The present invention likewise relates to a method for producing a winding tape wherein the blank described above in detail is first extruded into a strand with small outer dimensions and is subsequently calendered into a tape in the forming gap of a pair of rolls. In this regard, it is important to the invention that the surface of at least one roll be deformed under compression during the calendering of the round rope into a tape. In this way, the calendered tape obtains a cross-sectional shape that differs from the prior art rectangular shape, which in particular is characterized by a deformation of the tape edge regions. This deformation can go to the extent that the thickness of the tape edges tapers to almost nothing in the calendered state.

The degree of deformation of the roll surface is controlled by the relevant cross-section (diameter) of the round rope. This control can be accomplished, for example, by applying hydraulic or pneumatic pressure to the relevant roll body, which mechanically deforms to a greater or lesser degree when pressure is appropriately applied or relieved.

However, it is particularly advantageous, especially with regard to simplifying the production method and increasing the operational reliability of the production process, when the deformation of the roll surface as a function of the cross-section (diameter) of the round rope is accomplished by the latter itself, as is provided for in accordance with the invention. The introduction of the round rope into the roll gap results in a pressure increase there that not only causes deformation of the incoming intermediate product, as in prior art calendering methods, but also simultaneously causes deformation of the compressed surfaces of one or both of the rolls. When a round rope is used as an intermediate product in accordance with the invention, the highest pressure initially arises in the center region, which represents the thickened center region of the calendered tape under appropriate compression of the rolls and the concomitant deformation of the surface of at least one roll. However, as a result of the deformability of at least one roll surface, the deformation work done by the rolls also acts especially perpendicular to the calendering direction. The rope material from the initially radially pressurized round rope is distributed widely to both sides along the roll surface from the center of the rope in a steadily diminishing manner. It is important to the method in accordance with the invention that the round rope is guided immediately ahead of the forming gap of the roll pair. This has the effect of evening out the production process while at the same time improving tape quality.

Already known is a winding tape of unsintered polytetrafluoroethylene that is used for insulating coverings for electrical cables and conductors and has a planoconvex cross-sectional shape with a curved top boundary line and a straight bottom boundary line (DE PS 32 14 447).

The present invention provides an improvement on this known winding tape, in particular with regard to the compactness and freedom from porosity of a covering made from a winding tape. The improvement includes that the winding tape is designed as a flat profile with edge regions tapering to a point from the center to both sides, with uniform tape contours at the edges. The basis for this particularly flat cross-sectional shape, with tape thickness that decreases uniformly, i.e. continuously, to both sides, is the dimensions of the round rope used (starting material) in relation to the dimensions of the winding tape produced therefrom, as well as the use of rolls with deformable surfaces.

In carrying out the invention, the edges of the tape are wide, where the edge width on both sides of the center region—which determines the tape thickness—is at least 45%, preferably 50 to 80% of the total width of the winding tape. This wide tape, which tapers continuously toward the edges, results in an end product with especially smooth surface quality after sintering.

In this context, the cross-section of the winding tape in accordance with the invention can have the approximate shape of a rectangle that is extended in the direction of the narrow sides, wherein the tape thickness decreases continuously from the center of the tape to the sides at both edges. An especially advantageous embodiment of the invention results when the tape has the approximate shape in cross-section of a flattened dish, wherein the tape thickness decreases continuously from the center of the tape to the sides at both edges of the tape.

The tape thickness of a tape in accordance with the invention, measured at the tape center, is advantageously 20 to 200 μm, preferably 40 to 160 μm, and at the edge region is 5 μm and less. These measurements are significant when such a tape is to be used as a winding tape particularly for coverings of electrical cables and conductors, where it is important to ensure a compact covering with a smooth surface.

In accordance with another aspect of the invention, it is additionally useful here for the tape width to be from 5 to 50 mm, preferably 10 to 30 mm. The preferable tape width corresponds approximately to a rope diameter of 0.9 to 1.7 mm.

BRIEF DESCRIPTION OF THE DRAWINGS

The invention is explained in detail using the example embodiments depicted in FIGS. 1 and 2, wherein.

DETAILED DESCRIPTION OF THE PREFERRED EMBODIMENT

Figures 1, 2:
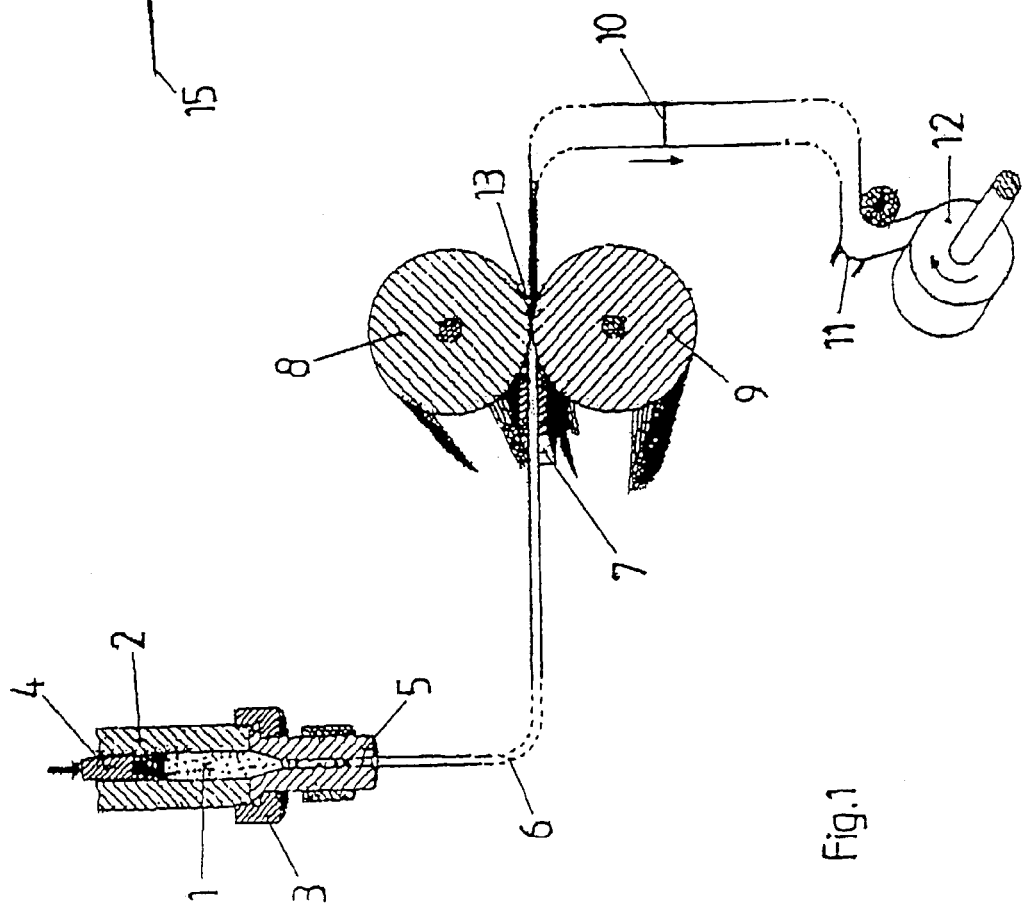
FIG. 1 illustrates the manufacturing method in accordance with the invention.
FIG. 2 shows the cross-section of a winding tape manufactured with this method.

A blank 1 molded of polytetrafluoroethylene powder and lubricating or slip agent is introduced into the feeder 2 of an extruder 3. Using the extrusion die 4, a round rope 6 is extruded from the die mouth 5. The rope 6 is transported, either directly or after interim storage in a suitable storage reservoir, to the guide nozzle 7. The output of the guide nozzle 7 ends directly before the roll gap of the two rolls 8 and 9. The surface of at least one of the two rolls 8 and 9 is deformable during calendering of the, round rope 6 into the tape 10 under the influence of compression or roll pressure brought about by the material of the round rope so that the calendered tape 10 does not have a rectangular cross-section, but rather a flat rolled cross-sectional profile with edge regions that taper to a point. The tape 10 is passed over the guide roller 11 and coiled by the take-up mechanism 12. This unsintered winding tape will be subjected to a sintering process once the winding product, for example the insulation of an electrical conductor, has been produced.

After the sintering process, the individual winding layers can no longer be unwound, not even from short lengths as is the case when rectangular cross-section winding tapes made of the same material are used. The surface of an electrical insulation produced with the tape in accordance with the invention is continuous, and, since it is practically free of protruding edges, smooth as well.

The following examples once again illustrate the aspects of the present invention with the same starting material, namely polytetrafluoroethylene, and a desired tape thickness of 50 μm. The term polytetrafluoroethylene here also includes tetrafluoroethylene polymers that are provided with modified additives, but in such quantities that the polymers, like polytetrafluoroethylene itself, cannot be machined from the melt.

EXAMPLE 1

A round rope with a diameter of 0.93 mm and a length of 15 m was extruded. This rope was calendered using the method in accordance with the invention to a winding tape with a length of 31 m, a tape width of 11 mm and a tape thickness of 50 μm.

EXAMPLE 2

A round rope with a diameter of 1.17 mm and a length of 15 m was extruded. Calendering yielded a tape with a length of 26.8 m, a tape width of 15 mm and a tape thickness of 50 μm.

EXAMPLE 3

A round rope with a diameter of 1.30 mm and a length of 15 m was extruded. Calendering of this rope into tape form in accordance with the invention produced a winding tape with a length of 28.9 m, a tape width of 17 mm and a tape thickness, measured in the tape center, of 50 μm.

If the tape thickness is to be increased as compared to examples 1 to 3, the other parameters must be changed accordingly.

EXAMPLE 4

A round rope with a diameter of 2.10 mm and a length of 15 m was extruded. This rope was calendered using the method in accordance with the invention to a winding tape with a length of 21.20 m, a tape width of 24 mm and a tape thickness of 150 μm.

EXAMPLE 5

A round rope with a diameter of 1.65 mm and a length of 15 m was extruded. Calendering of this rope into tape form in accordance with the invention produced a winding tape with a length of 20.85 m, a tape width of 16 mm and a tape thickness, measured in the tape center, of 100 μm.

An important factor when producing the winding tapes in accordance with examples 1 to 5 is that, as a result of the deformability of the surface of at least one roll 8 or 9, the tape material introduced in the roll gap 13 by the round rope 6 is formed by differential compression across the tape width.

FIG. 2 shows, at an enlarged scale, the approximate cross-section of a winding tape 10 produced in accordance with the invention. The largely free flow of the tape material from the tape center 14 transverse to the pull-off direction resulting from the deformability of at least one roll 8 or 9 under pressure yields a slender cross-sectional shape, approximately dish-shaped, with edge regions that taper to a point at the tape edges 15. Because of this particular forming of the round rope 6 into a tape 10, the tape edges 15 also are uniformly smooth. This results in problem-free further processing of the winding tape in accordance with the invention, and thus results in high-quality insulation for electrical cables and conductors, for example.

The invention claimed is:

1. A method for producing a winding tape from unsintered polytetrafluoroethylene wherein polytetrafluoroethylene powder is mixed with a lubricating or slip agent, the material is molded into a cylindrical blank and the blank is first extruded as a strand with small outer dimensions and subsequently calendered into tape form, wherein the strand extruded from the blank is a round rope that is calendered into the winding tape by compression in the radial direction such that the quantity of material remaining in the compressed center area made of polytetrafluoroethylene and lubricating or slip agent is greater than the quantity of material remaining in the areas approaching the tape edges.

2. The method in accordance with claim 1, wherein the elongation of the calendered tape length with respect to the length of the pressed round rope is a factor of 1 to 3, preferably 1.2 to 2.2.

3. The method in accordance with claim 1, wherein the distribution of material quantities across a winding tape cross-section that takes place during calendering is accomplished by one-sided or two-sided flattening of the curvature of the circumferential surface of the round rope in the central area that is subjected to compression.

4. The method in accordance with claim 1, wherein the round rope is calendered into an oval cross-section with edge regions that taper to a point.

5. The method in accordance with claim 1, wherein the round rope is calendered into a flat profile with edge regions that taper from the middle to a point on each side and with uniform edges.

6. The method in accordance with claim 1, wherein the width of the calendered winding tape corresponds to at least 6 times and preferably 8 to 14 times the diameter of the round rope.

7. A method for producing a winding tape from unsintered polytetra-fluoroethylene wherein polytetrafluoroethylene powder is mixed with a lubricating or slip agent, the material is molded into a cylindrical blank and the blank is first extruded as a strand with small outer dimensions and subsequently calendered in the forming gap of a pair of rolls into the winding tape, wherein the surface of at least one roll of said pair of rolls is deformed under compression during the calendering of the round rope into the winding tape.

8. The method in accordance with claim 7, wherein the degree of deformation of the roll surface is controlled as a function of the relevant diameter of the round rope.

9. The method in accordance with claim 8, wherein the control of the deformation is accomplished by compression of the roll body.

10. The method in accordance with claim 7, wherein the deformation of the roll surface as a function of the diameter of the round rope is accomplished by the latter itself.

11. The method in accordance with claim 7, wherein the round rope passes through a guide nozzle immediately ahead of the forming gap of the roll pair.

12. The method according to claim 1, wherein the winding tape is designed as a flat profile with edge regions tapering to a point from the center to both sides and with uniform tape contours at the edges.

13. The method according to claim 1, wherein the edges of the tape are wide, wherein the edge width on both sides of the center region, which determines the tape thickness, is at least 45%, preferably 50 to 80% of the total width of the winding tape.

14. The method according to claim 1, wherein the tape has the approximate shape in cross-section of a rectangle that is extended in the direction of the narrow sides, wherein the tape thickness decreases continuously from the tape center to the sides at both edges of the tape.

15. The method according to claim 1, wherein the tape has the approximate shape in cross-section of a flattened dish, wherein the tape thickness decreases continuously from the tape center to the sides at both edges of the tape.

16. The method according to claim 1, wherein the tape thickness is 20 to 200 μm, preferably 40 to 160 μm, and tapers to 5 μm and less at the edges.

17. The method according to claim 1, wherein the width of the tape is from 5 to 50 mm, preferably 10 to 30 mm.

18. The method according to claim 1, wherein the winding tape, when wound, forms a substantially planar surface thereby substantially eliminating protruding edges formed by the winding of the winding tape.

19. The method according to claim 18, wherein the wound winding tape is subjected to a sintering process to thereby eliminate the protruding edges.

* * * * *